United States Patent [19]
Horst

[11] Patent Number: 5,294,856
[45] Date of Patent: Mar. 15, 1994

[54] SHIFTED POLE SINGLE PHASE VARIABLE RELUCTANCE MOTOR

[75] Inventor: Gary E. Horst, Manchester, Mo.

[73] Assignee: Emerson Electric Co., St. Louis, Mo.

[21] Appl. No.: 747,855

[22] Filed: Aug. 20, 1991

Related U.S. Application Data

[63] Continuation-in-part of Ser. No. 516,280, Apr. 30, 1990, Pat. No. 5,122,697.

[51] Int. Cl.⁵ .............................................. H02K 21/38
[52] U.S. Cl. .................................... 310/181; 310/68 B; 310/259; 310/168
[58] Field of Search .................... 310/181, 68 B, 49 R, 310/162, 163, 164, 190, 154, 269, 259, 186, 168; 318/138, 254, 701, 798, 778

[56] References Cited

U.S. PATENT DOCUMENTS

| | | | |
|---|---|---|---|
| 3,604,961 | 9/1971 | Saldinger | 310/154 X |
| 3,978,356 | 8/1976 | Spiesberger | 310/162 X |
| 4,642,494 | 2/1987 | Lundin et al. | 310/49 |
| 4,940,912 | 7/1990 | Kant et al. | 310/162 |
| 5,015,903 | 5/1991 | Hancock et al. | 310/168 |
| 5,122,697 | 6/1992 | Horst | 310/181 |

Primary Examiner—Steven L. Stephan
Assistant Examiner—E. To
Attorney, Agent, or Firm—Polster, Lieder, Woodruff & Lucchesi

[57] ABSTRACT

A hybrid single-phase variable reluctance motor (31) has a stator (33) having a plurality of inwardly salient teeth (41A–41D) terminating at a central bore (37). The teeth are arranged in generally diametrically opposed pairs of teeth and are generally evenly spaced around the bore. A phase winding (43) is operatively associated with one pair of the stator teeth. The winding, when energized, causes a temporary magnetization of the stator teeth. A rotor (35) is disposed for rotation in the bore and has outwardly salient teeth (45A, 45B) generally diametrically opposed to each other. A permanent magnet (53) is disposed adjacent the bore at the end of one tooth (41D) of a second pair (41C, 41D) of stator teeth. One tooth (41D) of the second pair of stator teeth is offset with respect to a longitudinal axis ($A_1$) of the second pair of teeth. This offset acts to eliminate a stable detent position in which the rotor could otherwise "park" itself when it stops running. Parking in such a position makes it difficult to restart the motor.

18 Claims, 4 Drawing Sheets

SHIFTED POLE SINGLE PHASE VARIABLE RELUCTANCE MOTOR

This application is a continuation-in-part of U.S. patent application Ser. No. 516,280 filed Apr. 30, 1990, now U.S. Pat. No. 5,122,697.

BACKGROUND OF THE INVENTION

This invention relates to variable reluctance motors and, more particularly, to single-phase variable reluctance motors in which a motor pole is shifted to improve the torque profile of the motor.

In U.S. Pat. No. 5,122,697, which is assigned to the same assignee as the present application and which is incorporated herein by reference, there is disclosed a hybrid single-phase variable reluctance motor. A particular problem which the motor described therein is designed to solve is improvement in starting of the motor. This is because these types motors have a minimum reluctance position from which, if the rotor stops in that position, it is difficult to generate torque to start the motor. While various embodiments of the invention are described, in general, the motor is designed to have the rotor come to rest at a preferred position from which it is easy to start the motor.

While the motor of this invention works well for its intended purpose, some problems still persist. One, for example, is that the rotor may still have a stable detent or minimum reluctance position from which it is difficult to start the motor if the rotor "parks" there. While this problem is no longer as severe as in prior art single-phase variable reluctance motors which the motor of the 5,122,697 patent is designed to replace, it nevertheless can still be occur. One contributor to this problem is the type of bearings used in the motor. Typically these are either ball bearings or sleeve bearings. Each type bearing has a frictional load band. The actual amount of friction is a function of motor speed; but in general, at normal operating speeds, self aligning sleeve bearings are subject to 2-3 times the amount of friction as roller bearings. There is a critical region where the rotor must not stop if the motor is to start again. This region is where both the Hall effect device is not activated and where negative torque by the coil excited poles would result. The magnet torque available in this critical region must be sufficient to overcome the load friction due to the bearings or the rotor will stop in this area. The motor will not start if this should occur.

A second problem deals with the noise generated by motor "ovalizing". Motors are made such that the stator and rotor assemblies are installed within a shell or frame. In the typical two-pole motor construction of single phase variable reluctance motors, forces are produced as the rotor and stator poles come into alignment which produce an inward or pulling force on the lamination back iron at the location of the poles, and an outward or pushing force on the shell and lamination back iron at the point 90 electrical degrees from the poles. These forces cause the shell, which is generally circular in cross-section to distort into an oval shape. The metal flexure resulting from the distortion produces noise. In tests, this noise level has measured as high as 45 dba. This is an undesirable level.

SUMMARY OF THE INVENTION

Among the several objects of the present invention may be noted the provision of a hybrid, single-phase variable reluctance motor; the provision of such a motor to having a stator with at least one pair of generally opposed salient teeth forming poles; the provision of such a stator in which one of the stator teeth is offset or shifted with respect to the longitudinal axis of the tooth pair; the provision of such a stator design which reduces or eliminates stable detent positions in which the rotor could park itself when the motor stops running and in which position it is difficult to restart the motor; the provision of such a stator tooth configuration which is incorporated in an N-pole motor to effect the elimination or reduction of the detent positions; the provision of such an N-pole motor (where N is an even number increasing by multiples of 2) to reduce "ovalizing" of the motor shell or frame by more evenly distributing the forces produced when the rotor and stator poles come into alignment as the rotor turns through the frame; the provision of such distribution to reduce the flexure to which the frame is subjected, thus to reduce motor noise: and, the provision of such a motor which is easier to start and operate quieter. The number of N-pole pairs is what reduces the potential noise by redistributing the ovalizing forces. The shifted pole has no noticeable effect upon the ovalizing.

In accordance with the invention, generally stated, a hybrid single-phase variable reluctance motor comprises a stator having a plurality of inwardly salient teeth terminating at a central bore. The teeth are arranged in generally diametrically opposed pairs of teeth and are generally evenly spaced around the bore. A phase winding is operatively associated with one pair of the stator teeth. The winding, when energized, causes a temporary magnetization of the stator teeth. A rotor is disposed for rotation in the bore and has at least one pair of outwardly salient teeth generally diametrically opposed with respect to each other. A permanent magnet is disposed adjacent the bore at the end of one tooth of a second pair of the stator teeth. One tooth of the second pair of stator teeth is offset with respect to a longitudinal axis of the second pair of teeth. This offset acts to eliminate a stable detent position in which the rotor could otherwise "park" itself when it stops running. Parking in such a position makes it difficult to restart the motor. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figure 1:
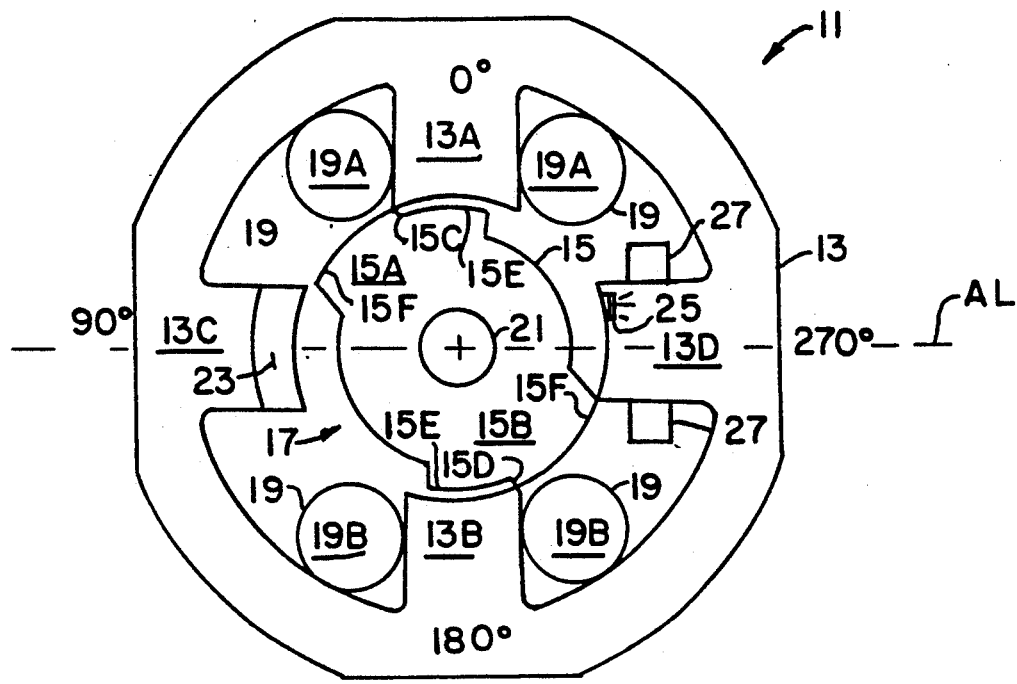
FIG. 1 is a diagrammatic view of hybrid, single-phase variable reluctance motor as disclosed in U.S. patent application Ser. No. 516,280.

Referring to the drawings, a FIG. 1 represents a hybrid, single-phase variable reluctance motor 11 having a stator 13 and a rotor 15. The rotor is disposed in a longitudinal central bore 17. The stator has four inwardly extending salient teeth 13A-13D. Teeth 13A, 13B comprise a first pair of teeth, and teeth 13C, 13D, a second pair of teeth. The teeth are generally evenly spaced about the stator and each pair of teeth are diametrically opposed to each other. A phase winding 19 is operatively associated with stator teeth 13A, 13B. When energized, the winding causes a temporary magnetization of teeth 13A, 13B. Rotor 15 is mounted for rotation on a shaft 21 and has two outwardly salient teeth 15A, 15B. These teeth are disposed 180 degrees with respect to each other. A permanent magnet 23 is disposed adjacent the central bore at the inner end of tooth 13C. The function of this magnet is to have rotor 15 come to rest in a preferred position when the motor is stopped, thus to facilitate ease of starting the next time the motor is started. Opposite tooth 13C is a Hall effect device 25 for sensing the position of rotor 15. The device is useful in determining when phase winding 19 is energized. With respect to the pair of stator teeth 13C, 13D, a longitudinal axis $A_1$ is shown as overlaying the centerline of each of these teeth.

Figure 2:
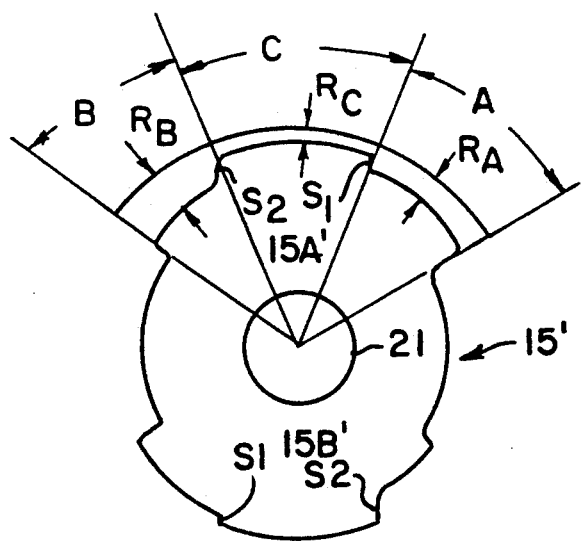
FIG. 2 is a diagrammatic view of rotor for use with the motor of FIG. 1.

As shown in FIG. 1, each rotor tooth has a shoulder 15C, 15D respectively which divides the tooth into a first section 15E and a second section 15F. These sections produce two different air gaps between the rotor poles and each stator pole, as the rotor pole sweeps past them. As seen in FIG. 2, a rotor 15' having salient teeth 15A', 15B', can have three sections A, B, and C respectively defined by shoulders $S_1$, $S_2$. Each section provides for a different air gap width $R_A$, $R_B$, and $R_C$. The reason for the varying air gap widths is discussed in detail in the co-assigned U.S. patent 5,122,697. Essentially, these changes are to effect switching of the Hall effect device to control application of current to winding 19.

Figure 3:
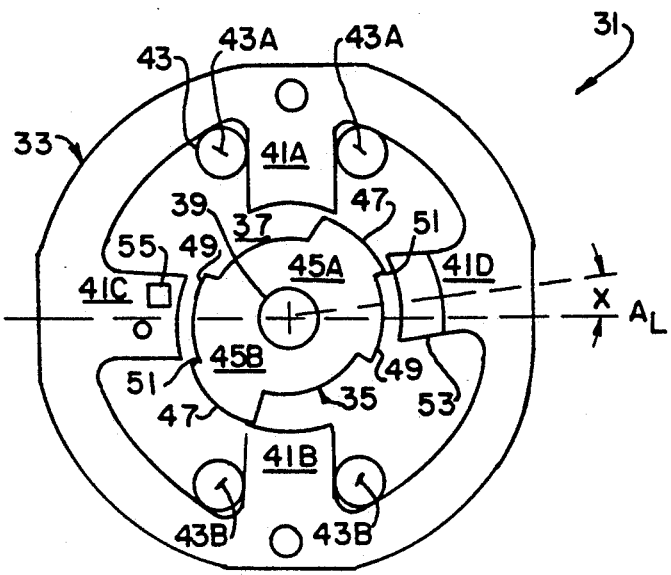
FIG. 3 is a diagrammatic view of a first embodiment of a hybrid, single-phase variable reluctance motor of the present invention in which a stator tooth is shifted in counter-clockwise (CCW) direction.

Referring now to FIG. 3, a hybrid single-phase variable reluctance motor 31 of the present invention is shown. The motor has a stator 33, and a rotor 35. The rotor is disposed in a central bore 37 and mounted for rotation on a shaft 39. The stator has a plurality of inwardly salient teeth 41 terminating at the central bore. Four such teeth 41A-41D are shown in FIG. 3. The teeth are arranged in generally diametrically opposed pairs of teeth (pairs 41A, 41B, and 41C, 41D). Each tooth activated by a coil is defined as a stator pole, so motor 31 is a two pole dynamoelectric machine. The teeth are also generally evenly spaced around the central bore. A phase winding 43 is operatively associated with one pair of the stator teeth, these being teeth 41A, 41B. The phase winding, when energized, causes a temporary magnetization of these stator teeth.

Rotor 35 has a pair of outwardly salient teeth 45A, 45B generally diametrically opposed to each other. Each tooth has a first section 47 and a second section 49. A shoulder 51 separates the two sections. A permanent magnet 53 is disposed adjacent the central bore at the end of tooth 41D of the second pair of stator teeth comprising teeth 41C, 41D. A rotor position detecting means 55 is disposed at tooth 41C for detecting the rotational position of rotor 35 in the central bore.

Figure 8:
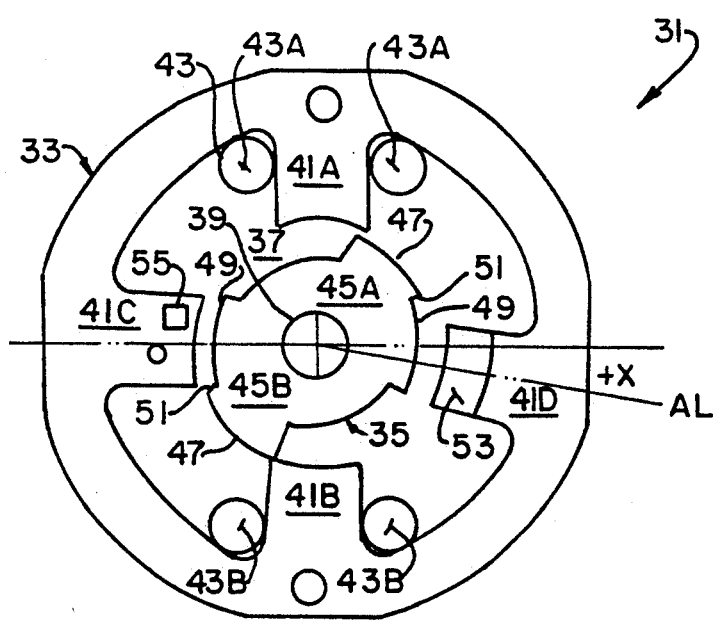

An important aspect of the present invention is that one tooth (tooth 41D) of the pair of stator teeth comprised by teeth 41C, 41D is offset with respect to a longitudinal axis $A_L$ of this pair of teeth. As seen in FIG. 3, the amount of offset is by an angle X which is measured from the centerline of tooth 41D to the longitudinal axis. The angle of offset can be varied, but is on the order of 10 degrees for a 2 pole motor. Further, while tooth 41D is shown offset in a counter-clockwise direction to the longitudinal axis, it can also be offset in the clockwise direction see (FIG. 8). In either event, because the stator is usually an assemblage of stator laminations, each lamination is formed with the desired offset pole. When stacked, the resultant structure will have a uniform offset along its length. It is therefore preferable that the direction and angle of pole offset be determined prior to manufacture of the stator laminations.

As shown in FIG. 3, the tooth 41D is the tooth having the permanent magnet 53 at its end adjacent the central bore of the stator. The offset tooth could be tooth 41C. However, it has been found that because of space requirements for inserting the coils, it is easier if the tooth with the adjacent permanent magnet is the one offset. This, again, would be reflected in each stator lamination.

Figure 6A:
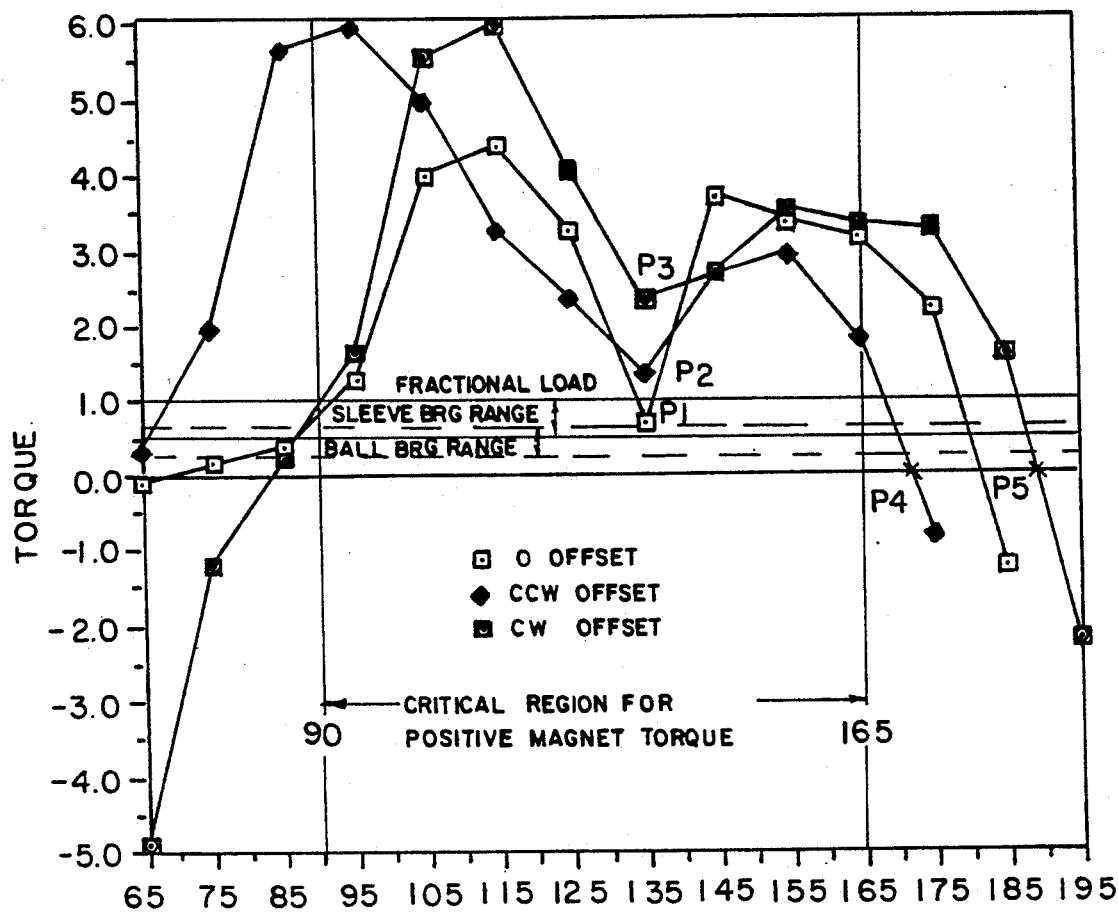
FIG. 6A is a graph illustrating the improvement in motor operating characteristics in accordance with the present invention.

The purpose for offsetting one of the stator teeth is best understood with respect to FIG. 6A. The graph presented in this Fig. is Torque vs. Rotor position in electrical degrees. Three plots are shown, one for a motor whose stator has no offset teeth, one for a motor of the present invention with CCW shift and one for a motor of the present invention with CW shift. Also shown in the graph are two bands. One band (indicated by the broken lines) is for the range of torque required to overcome the friction in a ball bearing for a range of motor speeds. Because the amount of friction varies as a function of motor speed, the torque required is represented as a band rather than as a straight line. The other band (indicated by the solid lines) is for the range of torque required to overcome the friction in a sleeve bearing for the range of motor speeds. The upper end of the range of the sleeve bearing band is 2-3 times that of the roller bearing band.

The plot for a single phase, variable reluctance motor without offset is shown in FIG. 6A. In the region between 90° and 165° the torque produced by the poles excited by the coils would be negative. It is within this region that all torque produced by the magnet and its associated set of poles must be positive and greater than the frictional load provided by the bearings during coast down to 0 RPM. If this criteria is not met (as at position p1), the rotor will find a stable position at that point. It is at that point that the Hall effect device is not activated so no current will be provided to the coils to start the motor. Even if current could be provided the motor will rotate opposite to the desired direction.

As seen by the plots in FIG. 6A for the motor of the present invention, the effect of the offsetting one of the stator teeth is such to eliminate this problem. It can be seen that the torque available at either points p2 or p3 (for CCW and CW rotation respectively) is greater than the maximum frictional level of the load bands. Therefore, the rotor will not "park" itself at those points.

The CW offset motor as seen in FIG. 8 has an added advantage to the CCW offset motor of FIG. 3. The stable position P5 of the CW offset is greater than the position P4 of the CCW offset motor. This results in greater starting torque for the same amount of excitation because the rotor step arcs 49 (see FIG. 5) overlap the coil excited poles more fully. This also reduces the start current because it is a higher inductance position. The result is better starting torque with less in-rush current.

Figure 5:
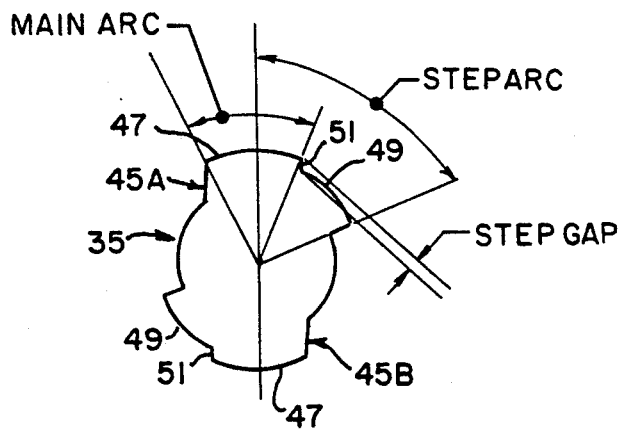
FIG. 5 is a diagrammatic view of rotor for use with the motor of FIGS. 3 and 4.
Figure 6B:
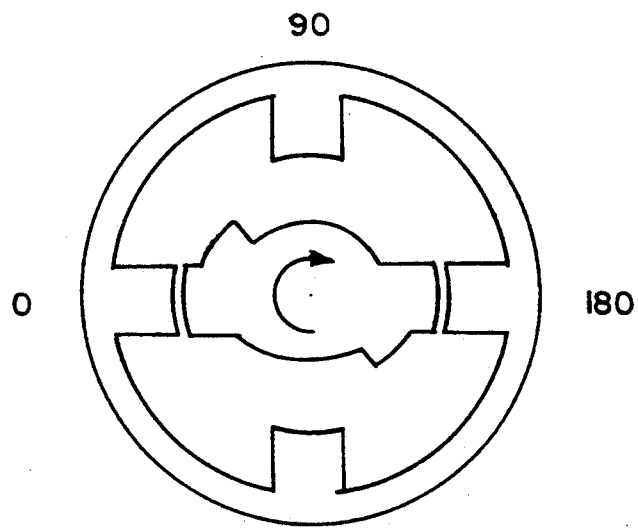
FIG. 6B is a motor diagram indicating degrees of rotation with respect to the graph.

Referring to FIG. 5, the rotor 35 construction is shown in more detail than is shown in FIG. 3. Each rotor pole has three elements which impact the effect of the stator pole offset. As shown in FIG. 5, these include the main arc of the rotor pole, the step arc, and the step gap. For the two motors used to develop the plots in FIG. 6, these values are:

|  | Motor with no offset | Motor with CCW offset | Motor with CW offset |
|---|---|---|---|
| Pole offset (deg.) | 0 | 10 | 10 |
| Main arc (deg.) | 45 | 50 | 50 |
| Step arc (deg.) | 58 | 70 | 65 |
| Step gap (in.) | .050 | .075 | .050 |

Even though there is a variation between the two rotor constructions, the impact of these is minimal compared with that caused by offsetting of the stator pole.

Figure 4:
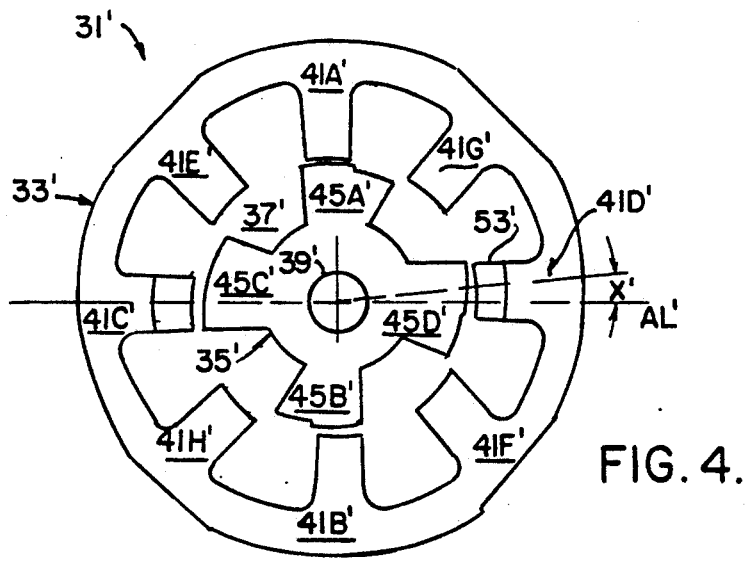
FIG. 4 is a diagrammatic view of a second embodiment of the motor of the present invention.

Referring to FIG. 4, an alternative embodiment of the motor of the present invention is indicated generally 31'. This motor has a stator 33' and a rotor 35' disposed in a central bore 37' for rotation by a shaft 39'. For sake of drawing clarity, the phase winding, and rotor position sensor are not shown. A permanent magnet 53' is shown positioned at the outer end of stator tooth 41D'.

Motor 31' is an N-pole single-phase, hybrid variable reluctance motor. For these motor configurations, N is a positive, whole integer such as 2, 4, 6, etc. In motor 31', N=4, and the motor may also be referred to as a 4-4 motor. This latter designation means the motor has four stator poles, and four rotor poles. In the stator, each pole is, as previously noted, defined by an opposed pair of inwardly salient stator teeth. The four stator poles are therefore defined by the following pair of generally diametrically opposed teeth: 41A'–41B', 41C'–41D', 41E'–41F', 41G'–41H'. Rotor 35' has four outwardly salient teeth 45A'–45D' each defining one rotor pole. The centerline of tooth 41D' is offset by an angle X' with respect to the longitudinal axis $A_L$, of the pair of teeth 41C'–41D'. Again, the tooth may be offset to either side of the longitudinal axis, the amount of offset being up to 10 degrees.

With respect to FIG. 6A, the effect of having an N-phase motor would be simply to compress the graph. The fact there are now more stator teeth does not require, for example, that more than one stator tooth be offset. Neither does it effect the angularity of the offset. As a practival matter, the offset angle is given by OFFSET ≈20°/N.

Figure 7:
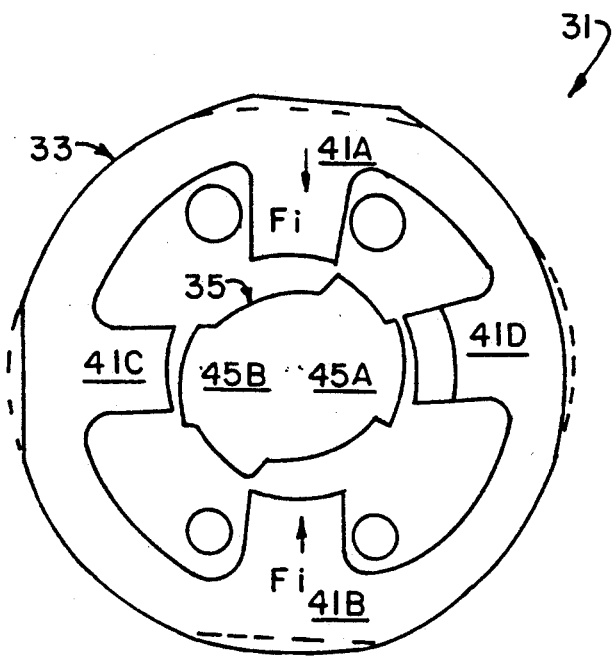
FIG. 7 is a diagrammatic view of a hybrid, single-phase variable reluctance motor in which "ovalizing" of the motor is illustrated; and, FIG. 8 is a diagrammatic view of a first embodiment of a hybrid, single-phase variable reluctance motor of the present invention with CW shift.

Use of an N-pole motor has an additional beneficial effect. This is to reduce the "ovalizing" effect on the motor frame resulting from the forces produced when the rotor and stator poles align. Referring to FIG. 7, in a 2-2 motor such as motor 31, as the rotor poles 45A, 45B, align with, for example, the stator pole including stator teeth 41C, 41D, normal forces are created. Force $F_i$ tends to compress the frame inwardly at the stator pole defined by teeth 41A, 41B. Thus the frame is distorted from its normal circular to an oval shape. It will be understood that as the rotor poles sweeps toward the other pair of stator teeth, the forces are reduced to approximately zero. The constant flexing of the frame which occurs in a motor operating at several hundred, or thousand rpm's is one of the major contributors to motor noise.

In a 4-4, 6-6, or 8-8 motor with or without an offset stator tooth, the presence of more poles lessens the distortion described above. The additional poles mean a distribution of the normal forces causing less ovalizing or distortion of the frame. While there is still some distortion of the frame at each pole, it is significantly less than in a 2-2 motor, for example. As a result, the amount of motor noise attributable to this source is substantially reduced.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A hybrid single-phase variable reluctance motor comprising:
    a stator having at least two pair of inwardly salient teeth terminating at a central bore, the teeth being arranged in diametrically opposed pairs of teeth which are evenly spaced around said central bore;
    a phase winding operatively associated with a first pair of said stator teeth and which, when energized, causes a temporary magnetization of the stator teeth;
    a rotor disposed for rotation in the central bore and having at least one pair of outwardly salient teeth diametrically opposed to each other;
    a permanent magnet positioned at an end of one tooth of a second pair of said stator teeth, one tooth of said second pair of stator teeth being offset with respect to a longitudinal axis of said second pair of teeth; and, the offset acting to eliminate a stable detent position in which the rotor could stop when the motor stops running, stopping in such a position making it difficult to restart the motor.

2. The motor of claim 1 wherein the offset tooth of said second pair of teeth is offset to either side of the longitudinal axis.

3. The motor of claim 2 wherein the stator is formed of a plurality of stacked laminations each of which is fabricated with an offset tooth.

4. The motor of claim 3 wherein the offset tooth is the one at which the permanent magnet is positioned.

5. The motor of claim 3 wherein the degree of offset is given by the formula OFFSET =20°/N, where N is the number of rotor poles.

6. The motor of claim 2 wherein the rotor and stator each have more than two poles thereby to reduce the amount of "ovalizing" of a motor frame.

7. The motor of claim 6 having N number of rotor poles and stator tooth pairs, where N is a positive integer and the stator tooth pairs are evenly spaced about the rotor.

8. The motor of claim 1 further including a rotor position detector disposed at the other tooth of said second pair of stator teeth for detecting a rotational position of the rotor in the central bore.

9. In a hybrid single-phase variable reluctance motor having a stator with at least two pair of inwardly salient teeth terminating at a central bore, the teeth being arranged in diametrically opposed pairs of teeth which are evenly spaced around said central bore, a phase winding operatively associated with a first pair of said stator teeth and, when energized, causing a temporary magnetization of said one pair of stator teeth, a rotor disposed for rotation in the central bore and having at least one pair of outwardly salient teeth diametrically opposed to each other, a permanent magnet positioned at an end of one tooth of a second pair of said stator teeth, and a rotor position detector disposed at the other stator tooth of said second pair thereof for detecting the rotational position of the rotor in the central bore, the improvement wherein one tooth of said second pair of stator teeth is shifted with respect to a longitudinal axis of said second pair of teeth thereby to eliminate any stable detent position in which the rotor could otherwise stop when the motor is stopped, the torque required to move the rotor when stopped in this position making it difficult to restart the motor.

10. The improvement of claim 9 wherein the shifted tooth is shifted to either side of the longitudinal axis.

11. The improvement of claim 10 wherein the stator is formed of a plurality of stacked laminations each of which is fabricated with a shifted tooth.

12. The improvement of claim 11 wherein the permanent magnet is positioned at the shifted tooth.

13. The improvement of claim 10 wherein the shifted tooth is shifted with respect to the longitudinal axis by an amount equal to 20°/N, where N is the number of rotor poles.

14. The improvement of claim 9 wherein the rotor and stator each have more than two poles thereby to reduce the amount of "ovalizing" of a motor frame.

15. The improvement of claim 14 having N number of rotor poles and stator tooth pairs, where N is a positive integer and the stator tooth pairs are evenly spaced about the rotor.

16. An N-pole single phase variable reluctance motor comprising:
   a stator having at least two pair of inwardly salient teeth terminating at a central bore, the teeth being arranged in a diametrically opposed pairs of teeth evenly spaced around said central bore;
   a phase winding operatively associated with a first pair of stator teeth and which, when energized, causes a temporary magnetization of said stator teeth; and,
   a rotor disposed for rotation in said central bore and having at least one pair of outwardly salient teeth diametrically opposed to each other, and wherein one tooth of a second pair of stator teeth is angularly offset with respect to a longitudinal axis of said second pair of stator teeth, the degree of angular offset being determined by the formula OFFSET = 20°/N where N is the number of rotor poles.

17. A hybrid single-phase variable reluctance motor comprising:
   a stator having at least two pair of inwardly salient teeth terminating at a central bore, the teeth being arranged in diametrically opposed pairs of teeth which are evenly spaced around said central bore;
   a phase winding operatively associated with a first pair of said stator teeth and which, when energized, causes a temporary magnetization of the stator teeth;
   a rotor disposed for rotation in the central bore and having at least one pair of outwardly salient teeth diametrically opposed to each other; and,
   a permanent magnet positioned at an end of one tooth of a second pair of said stator teeth, one tooth of said second pair of teeth being offset with respect to a longitudinal axis of said second pair of teeth, said offset tooth being offset to either side of the longitudinal axis, the offset acting to eliminate a stable detent position in which the rotor could stop when the motor stops running, stopping in such detent position making it difficult to restart the motor, and the rotor and stator each having more than two poles thereby to reduce the amount of "ovalizing" of the motor frame.

18. In a hybrid single-phase variable reluctance motor having a stator with four of inwardly salient teeth terminating at a central bore, the teeth being arranged in diametrically opposed pairs of teeth which are evenly spaced around the central bore, a phase winding operatively associated with a first pair of said stator teeth and, when energized, causing a temporary magnetization of said first pair of stator teeth, a rotor disposed for rotation in the central bore and having at least one pair of outwardly salient teeth diametrically opposed to each other, a permanent magnet positioned at an end of one tooth of a second pair of said stator teeth, and a rotor position detector disposed at the other tooth of said second stator pair for detecting the rotational position of the rotor in the central bore, the improvement wherein one tooth of said second pair of stator teeth is shifted with respect to a longitudinal axis of said second pair of teeth thereby to eliminate any stable detent position in which the rotor could otherwise stop when the motor is stopped, the torque required to more the rotor when stopped in this positioned making it difficult to restart the motor, and the rotor and stator each having more than two poles thereby to reduce the amount of "ovalizing" of a motor frame.

* * * * *